Figure 1:
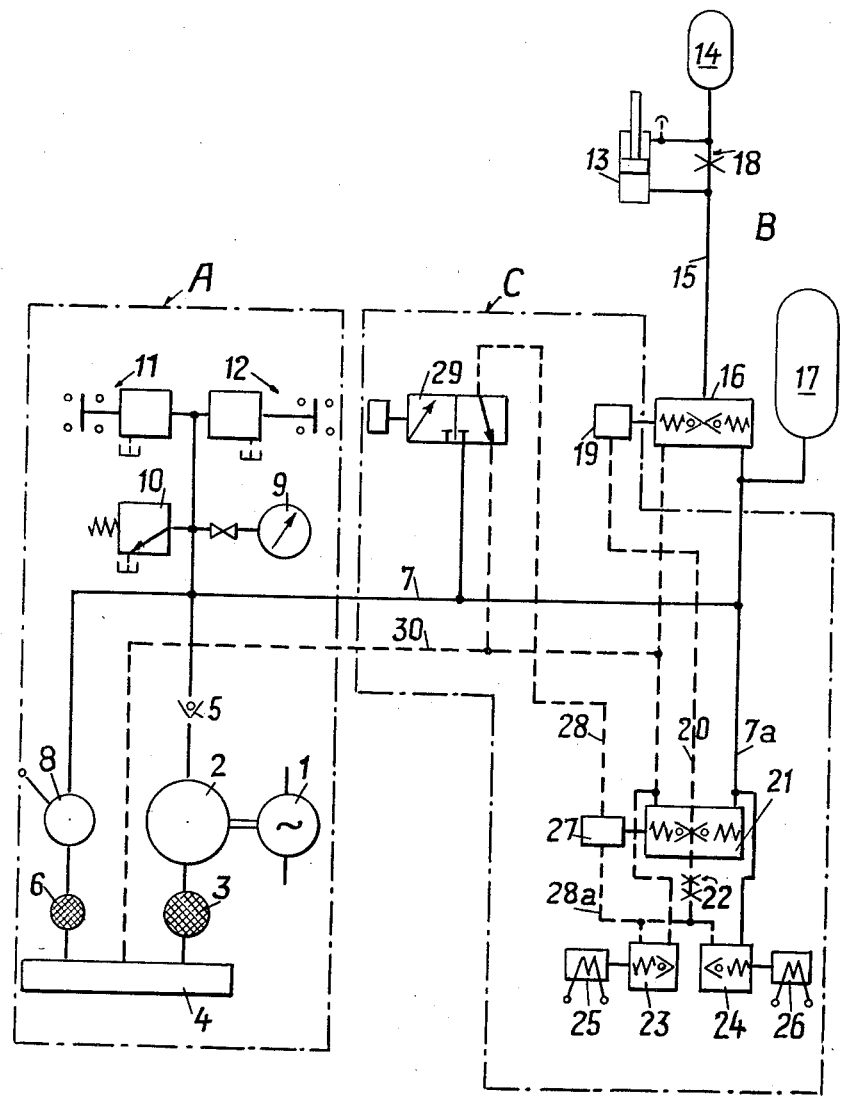

United States Patent Office 3,048,016
Patented Aug. 7, 1962

3,048,016
HYDRAULIC DRIVE FOR ELECTRIC
SWITCHGEAR
Gerhard Buechner, Zurich, Switzerland, assignor to Oerlikon Engineering Company, Zurich, Switzerland, a corporation of Switzerland
Filed Feb. 21, 1961, Ser. No. 90,789
Claims priority, application Switzerland Mar. 1, 1960
7 Claims. (Cl. 60—51)

The present invention relates to hydraulic drives for electric switchgear in which the energy for performing the cutting-out or breaking step is built-up during the cutting-in step, and more particularly to such drives which comprise a pressure supply circuit, a control circuit and an operating circuit.

Actuation of the movable elements of electric switchgear by hydraulic power transmission has been known for quite some time. It has been proposed, for example, to use linkages involving insulating liquids and hydraulic means connected in parallel as well as in series for operating a plurality of drive points. The drive point itself is formed by a working cylinder which through gear transmission is connected, directly or indirectly, to the switch member which has to be driven. It further is known to associate with each oil linkage a cutting-out spring which in cutting-in is stressed by any suitable drive. It also is known to use pressurized containers or pressure-oil magazines for storing the driving energy. When using such known drive means, however, the following disadvantages are encountered. In the switching position in which the entire system is under pressure (which position may be either the cut-in or the cut-out position according to the type of drive) the cutting-out springs are held stressed by means of the hydraulic pressure via the working cylinder. The force required therefore must be great enough to prevent unintentional cutting-out movements even in the case of substantial pressure fluctuations. The latter may be caused by great temperature differences and also by a slow pressure drop in the case of troubles such as slight leakage. In such cases, there always must be a sufficient energy reserve in order to guarantee a complete switching step at the right speed before the contacts begin to open or close slowly and unintentionally under the spring action. An absolute guarantee against such contact-pin movements cannot be obtained by the means proposed so far or, at the best, only with the aid of complicated ancillary means which in turn have to be given a control of their own comprising a pilot wire or control rod.

The deficiencies mentioned of the known types of drives of this type may be avoided when the working circuit of the hydraulic drive comprises, in accordance with the present invention, besides at least one hydraulic working cylinder, a working valve, a hydraulic cut-in accumulator and a hydraulic cut-out accumulator.

Forms of the invention are shown in a simplified way in the drawings, in which—

Figure 2:
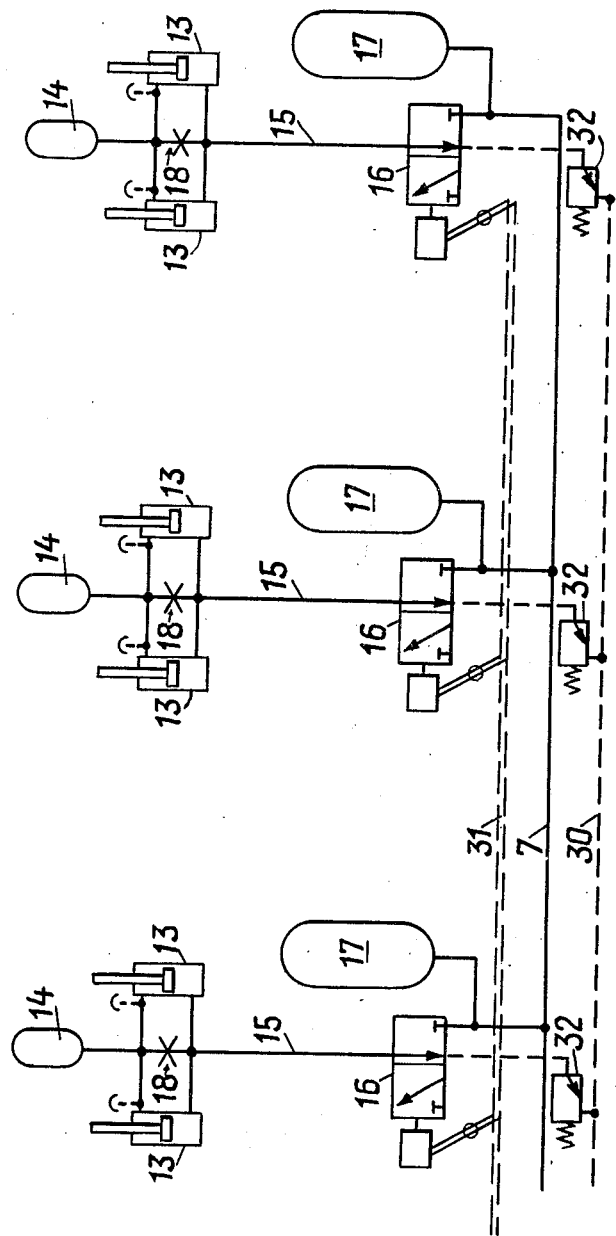
Figure 3:
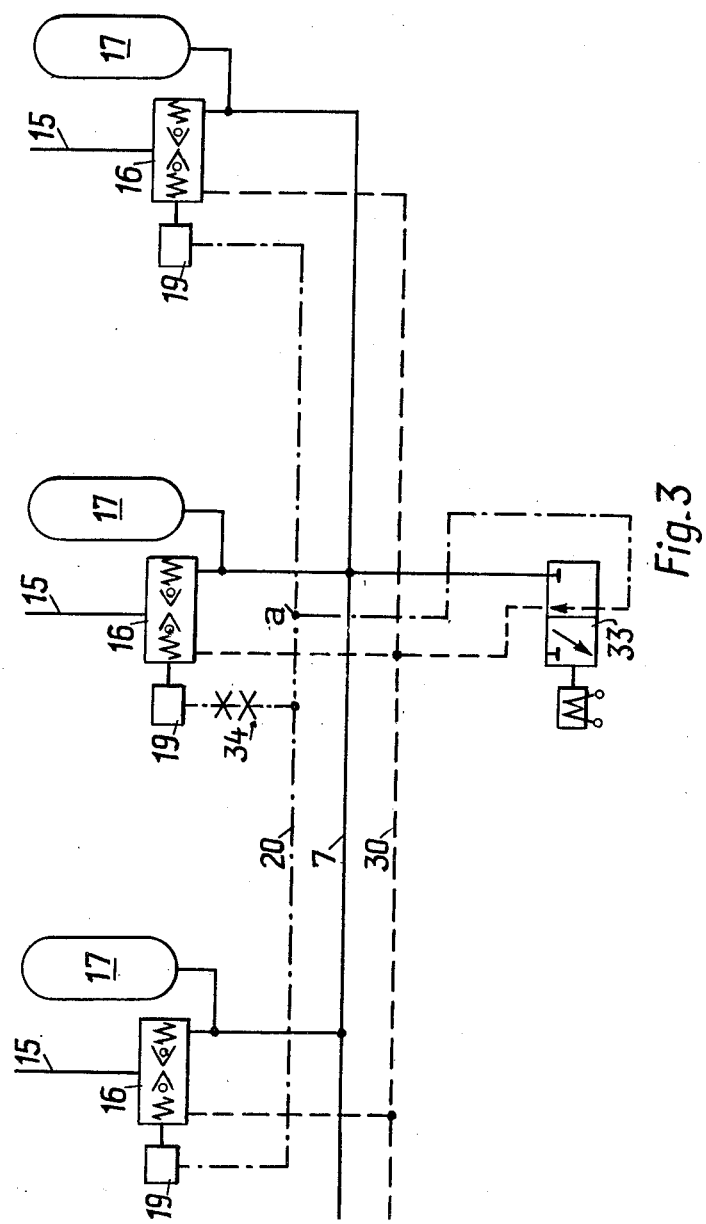
Figure 4:
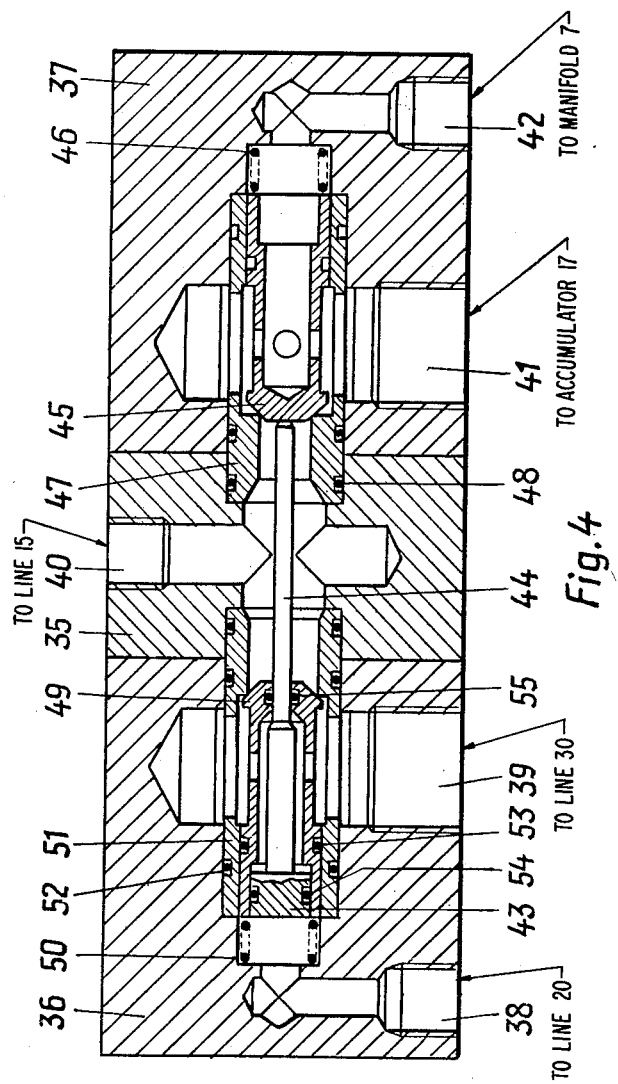
Figure 5:
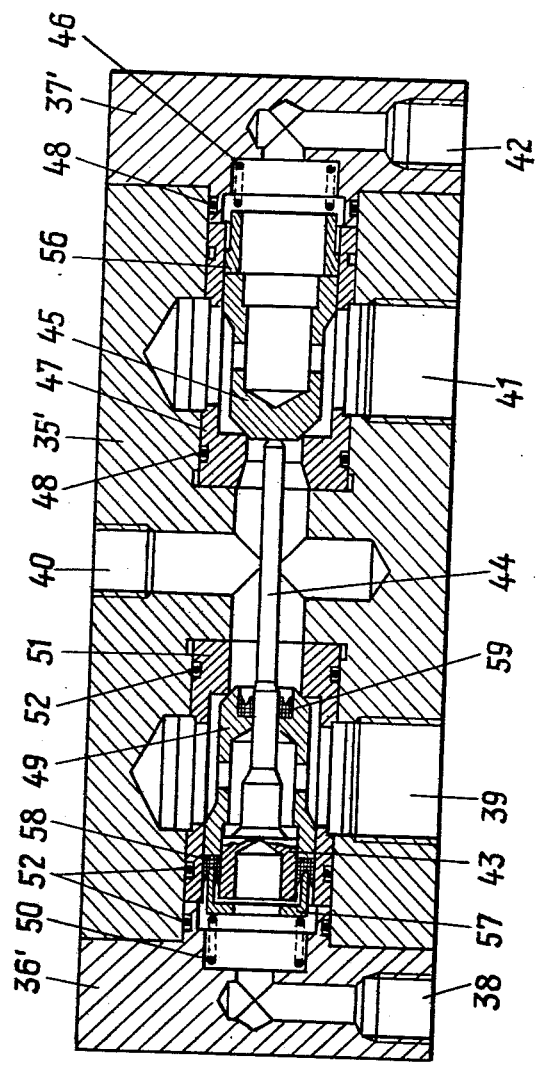
Figure 6:
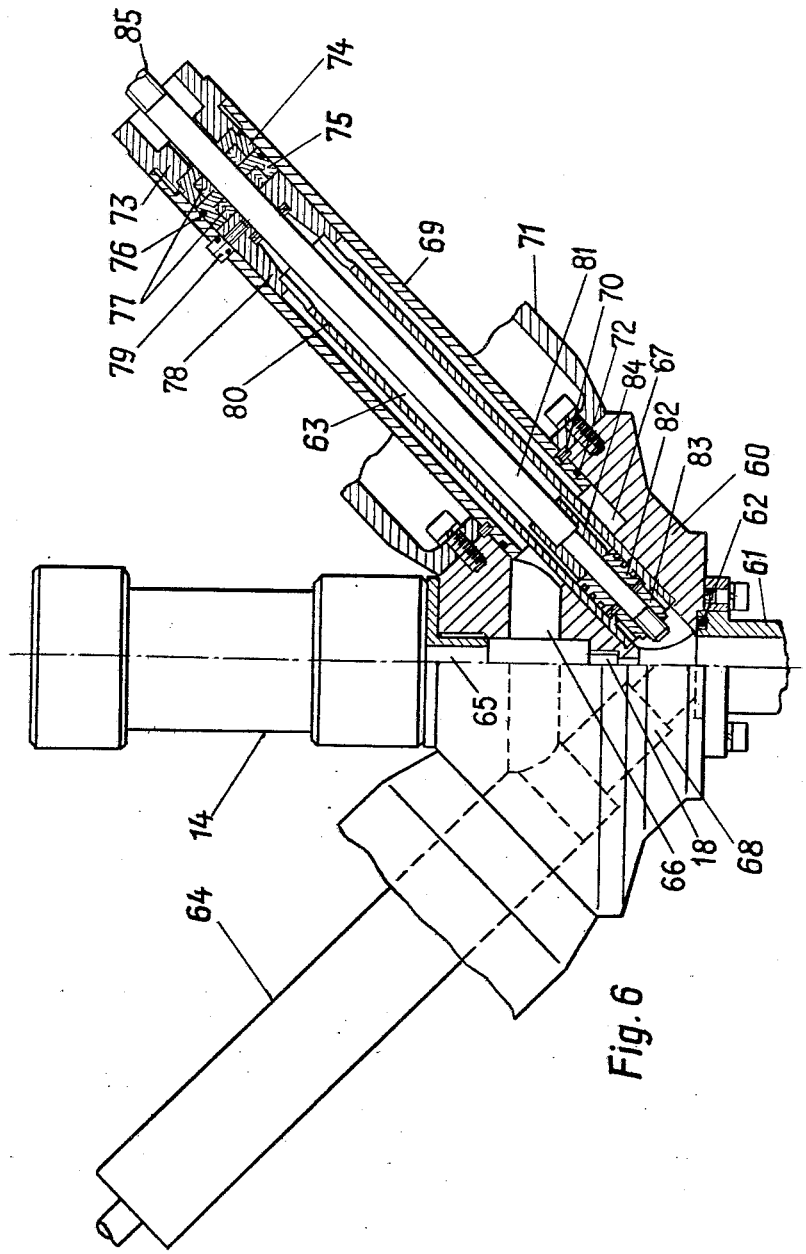
Figure 7:
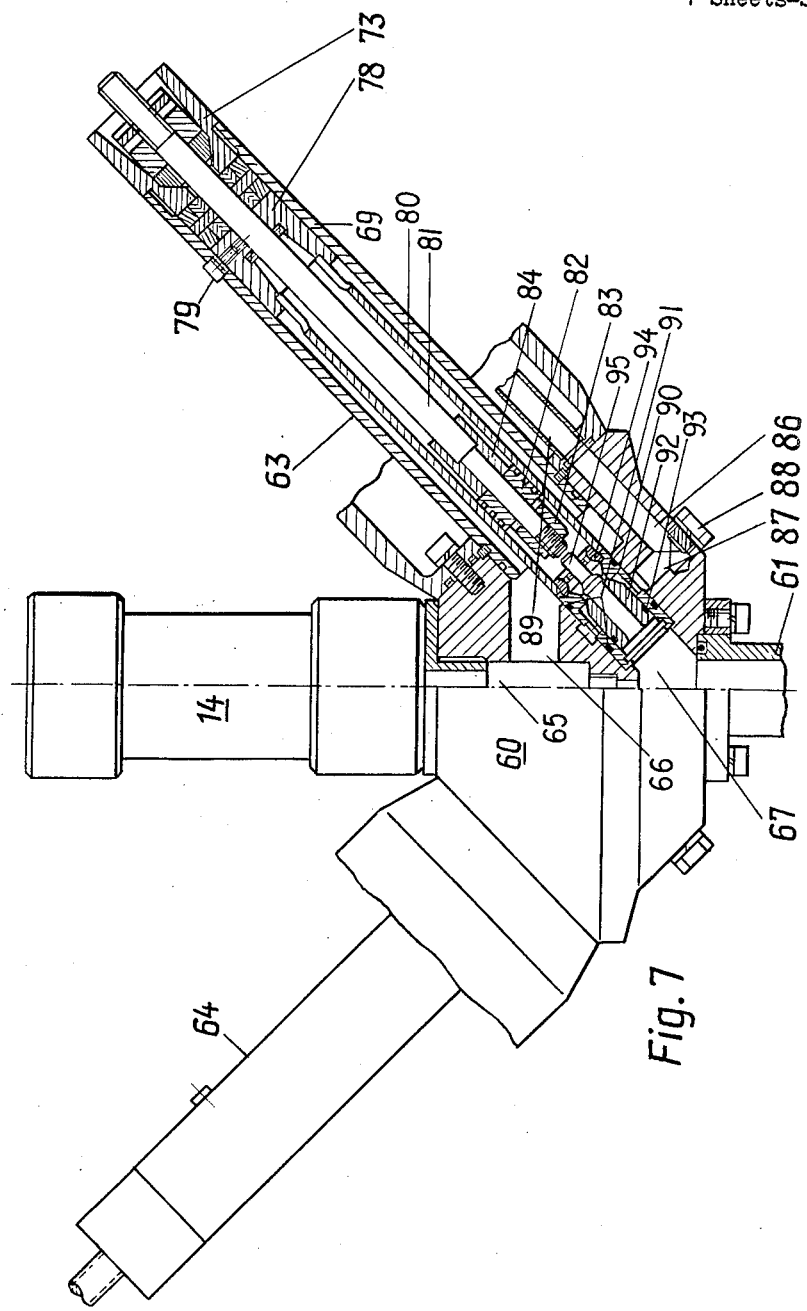

FIG. 1 is a schematic drawing of a hydraulic drive, and
FIGS. 2 and 3 relate to special working circuits of this drive;
FIGS. 4 and 5 illustrate working valves; and
FIGS. 6 and 7 depict hydraulic working cylinders.

The hydraulic operating arrangement shown in FIG. 1 relates to a drive for a single-pole switch. The electric motor 1 drives the hydraulic pump 2 which, for example, may be a piston pump. The latter is connected on the suction side via a suction filter 3 to the reservoir 4, and on the pressure side via a check valve 5 to the pressure-distributing manifold 7. A handpump 8 with a filter 6 and a check valve (not shown) is connected across motor-pump 2. Ancillary means comprising a manometer 9 with a shut-off valve, a relief valve 10 and two press-switches 11, 12 are connected to manifold 7. The entire assembly may be regarded as the pressure-supply portion A of the drive, in contra-distinction to the working circuit B and the control circuit C.

The working circuit B comprises the working cylinder 13, and the cut-out accumulator 14 disposed close to cylinder 13 and connected to that side of the differential cylinder which corresponds to the smaller working face of the piston. To that side of the differential cylinder which corresponds to the larger working area of the piston, is connected the pressure line 15 with the hydraulically controlled working valve 16. Hydraulic accumulator 17 has at least double the useful volume of accumulator 14 and is connected to the pressure side of valve 16. Between cut-out accumulator 14 and pressure pipe 15 is disposed a choke 18.

The control circuit C includes the hydraulic control element 19 of working valve 16. Element 19 through control pipe 20 is connected to a first control or preliminary valve 21 which also is hydraulically controlled. Element 19 further is connected to two pilot valves 23, 24 through a choke 22 which is formed as a delay member and may comprise, for example, a set of orifice plates, and said valves 23, 24 are actuated by electromagnets 25, 26. A hydraulic control element 27 of valve 21 receives its control command alternatively from either of the two pilot valves 23, 24 or via a control pipe 28 from a hand control valve 29. All the valve discharge pipes are connected to a central return pipe 30 which opens into reservoir 4.

The mode of operation of the arrangement described is as follows: Motorpump 2 or handpump 8 forces the driving liquid into manifold 7 to which is connected cut-in accumulator 17. The portion of the working valve 16 connected to accumulator 17, acts as check valve which is held closed by the pressure building up in the system. Accumulator 17 is charged through the motor pump up to the maximum operating pressure set at one of the two press-switches, for example 11, whereupon the press-switch automatically interrupts the circuit energizing the motor. When filling the accumulator through handpump 8, the maximum operating pressure has to be maintained by watching manometer 9. If, for any reason, the pressure rises beyond the maximum operating pressure, relief valve 10 will respond, at the latest, at a value of 1.2 times said maximum pressure to prevent a further pressure increase. The second press switch 12 acts as locking switch for, among other things, the electric control circuit of the switch drive mechanism, and serves to prevent an electrically triggered actuation of the drive below an adjustable minimum pressure. When, in the normal state, an electrical command for cutting-in is transmitted to switch-in coil 26, the latter opens pilot valve 24. A pressure wave then is sent from manifold 7 via an auxiliary line 7a and an ancillary control line 28a to the hydraulic actuating element 27 of preliminary control valve 21. The latter thereby is actuated so that the right-hand check valve which holds line 7a closed, is opened, while the left-hand check valve is blocked and thus closes control line 20 from discharge line 30. A pressure shock is delivered into control line 20 via first control or preliminary valve 21 which has a substantially wider cross-section than the pilot valves 23 and 24, and this shock actuates the working unit 16 through element 19. The right-hand check valve of unit 16 thereby is opened, and the left-hand check valve is closed. Cut-in accumulator 17 by virtue of the very wide flow cross-section in unit 16 now may discharge through unit 16 into pressure line 15 practically without pressure loss and move the piston of working cylinder 13 into the upper terminal position. Choke 18 hereby prevents a simultaneous pressure compensation to the other piston side. When the working-cylinder piston is moving upwardly, the oil displaced thereby flows into cut-out accumulator 14 which thus is charged. Its size preferably is chosen such that when the accumulator is charged with the volume displaced by the piston movement the pressure in accumulator 14 will be at least equal to the minimum admissible cut-out pressure. When the cut-in movement has come to an end, choke 18 allows a slow pressure compensation between cut-out accumulator 14 and cut-in accumulator 17 so that equal pressures are maintained on both faces of the piston although the temperature may fluctuate and there may be a slight leakage at any point of the system. This equalization of pressure prevents the working-cylinder piston from sinking in the case of a slow pressure drop, since the resultant force on the piston is always in an upward direction. In the cutting-out step, working valve 16 is controlled to relieve the pressure. Cut-out accumulator 14, owing to the locking action of choke 18 in high-speed processes, discharges on the piston of working cylinder 13 and moves same downwardly. The liquid displaced by the piston underside flows through pressure line 15 and the left-hand check valve (now open) of working-valve unit 16 into return line 30.

Valve unit 16 for putting pressure line 15 under pressure and relieving it of such pressure, is controlled as follows: After the electrical cut-in signal transmitted to coil 26 of pilot valve 24 has caused the latter to open and the actuating member 27 of preliminary valve 21 to be set under pressure, the right-hand check valve thereof is opened and the left-hand check valve is closed. Control line 20 then communicates with auxiliary pressure line 7a. Such operation is possible only because choke 22 is disposed in the connecting line from the pilot valves 23, 24 to the output of preliminary valve 21. The hydraulic pulse which is sent into the auxiliary control line 28a when opening the pilot valve 24, would by-pass at once into control line 20 in the absence of any choke 22. However, in such a case, the pulse would be very weak and would act upon the actuating members 19 much too slowly and with insufficient force. Such by-pass is delayed by choke 22 until the actuating member 27 has fully executed its movement. From this time onward, choke 22 acts as a hydraulic self-detent for actuating element 27 in that the static pressure present in control line 20 acts on the actuating member 27. This state of operation in the system remains unchanged until an electrical cut-out signal is delivered to coil 25 of pilot valve 23. The latter then is opened and connects auxiliary control line 28a to the return system. The pressure on actuating member 27 of preliminary valve 21 thereby is relieved. The left-hand check valve of valve unit 21 then is opened on account of the pressure existing in control line 20. The direction of flow in the latter thus is reversed whereby the pressure in the line drops and actuating member 19 of valve unit 16 releases the latter's left-hand check valve. In this way pressure line 20 is conditioned to pass fluid from member 19 to pipe 30, and the piston of working cylinder 13 is permitted to initiate the cut-out movement under the action of cut-out accumulator 14.

An additional advantage of the arrangement disclosed by the invention resides in the possibility of an extremely rapid reduction in pressure of a working circuit for theoretically unlimited energy content, with the aid of a very weak electrical signal. In this manner, the delay periods are very much reduced with respect to those electric power switches having mechanical or pneumatic drive means.

In FIG. 2 is shown the application of the invention to an arrangement including a number of switches. Equal parts have the same reference numbers as in FIG. 1. The differential driving cylinders 13 each drive a contact pin. They are arranged in pairs so that two switching points are actuated by a single working circuit. One of the cut-out accumulators 14 is associated with a pair of working cylinders having a common choke 18. The pressure lines 15 connect the working cylinders and the cut-out accumulators with the mechanically actuated working valves 16 which in this case are slide valves. The cut-in accumulators 17 with the pressure manifold line 7 as well as the return line 30 are connected to the respective junctions of the valves 16. These valves are mechanically actuated by a common tie rod 31 which in turn is actuated by any suitable mechanism (not shown). The returns of the working valves are connected to the central return line 30 through relief valves 32. The working circuits thus may be prevented from draining beyond the required extent, which otherwise could lead to the inflow of air into the hydraulic system.

In FIG. 3 is shown a control arrangement for the three working circuits (incompletely shown) of a drive arrangement corresponding to FIG. 2 for multipolar switches. Here, controlled and unlockable check valves are used in lieu of the mechanically actuated slide valves 16, and synchronization of the control commands for the three valves is attained only by hydraulic means. On the pressure side, the valves are again connected to the cut-in accumulators 17 and the manifold line 7, while the returns lead to the central return line 30. The hydraulic actuating elements 19 of the working valves 16 are interconnected by the common control line 20 which in turn is connected to an electromagnetically controlled valve 33. Construction preferably is such that the spacings between the point $a$ of control line 20 and the actuating means 19 of the two exterior valves 16 are equal. That actuating element 19 of central valve 16 which is disposed near to branch $a$, is connected to control line 20 through a set of orifice plates 34 which act as a delay member. A pressure wave produced by means of control valve 33, arrives in control line 20 at branch $a$. Owing to the orifice-plate set 34, a delay is caused in the short path to the actuating member 19 of the central valve, so that the control pulse arrives at the three actuating elements 19 simultaneously.

FIG. 4 shows a form of working valve 16 having a built-in actuating element, which is particularly simple, positive in operation and free of oil leakage. This working valve unit comprises three threadably interconnected housing parts, i.e. a central housing 35 and two lateral housings 36, 37. To bore 38 of lateral housing 36 is connected the control line 20; to bore 39 is connected the central return line 30; to bore 40 of central housing 35 is connected the pressure line 15 leading to one or more of the working cylinders 13; to bore 41 of lateral housing 37 is connected the cut-in accumulator 17; and to bore 42 is connected the central pressure-distributing manifold 7. A piston 43 with a piston rod 44 is the actuating element for the check valve in lateral housing 37, which valve comprises a cone 45, a spring 46 and a bushing 47 which at the same time serves as valve seat and guide. Exterior sealing is effected by two gaskets 48. In lateral housing 36 is disposed a second check valve comprising a cone 49, a spring 50, a bushing 51 and three gaskets 52, 53 and 55. 54 is a piston packing ring.

Cut-in accumulator 17 which is connected to bore 41, is charged through manifold 7 which is connected to bore 42. Owing to the pressure present in said bores 41 and 42, valve cone 45 is pressed against valve seat 47. When this valve has to be opened, bore 38 in lateral housing 36 has to be pressurized from line 20. Since the face of piston 43 is larger than the cross-section on valve seat 47, piston 43 with piston rod 44 and valve cone 45 is pushed to the right when the pressures in the two bores 38 and 42 are equal. At the same time, valve cone 49 is pressed against seat 51, whereby this valve is held closed against the action of the pressure building up in bore 40. In this state, the bores 40, 41 are interconnected but neither communicates with bore 39. When the pressure is reduced in bore 38 again, for example by connecting it through a suitable preliminary valve (not shown) to central return line 30, piston 43 with rod 44 is moved to the left by cone 45 under the action of the pressure existent in the bores 41 and 42, until cone 45 again is seated on seat 47. At the same time, cone 49 is unseated under the action of the pressure in bore 40. The bores 39 and 40 thereby are interconnected, and pressure line 15 which connects with bore 40 and with working cylinder 13 thereby are connected for return flow.

When the pressure in bore 40 has decreased approximately to the pressure in the return line, cone 49 under the action of spring 50 again engages seat 51 and prevents further drainage of the working circuit connected to bore 40, which circuit thus remains under a slight excess pressure as determined by spring 50. Thereby the inflow of air into the working circuit is prevented.

A second form of working valve is shown in FIG. 5 in which like parts have like reference numbers as in FIG. 4. The valve comprises a single housing 35' and two covers 36', 37' screwed thereto. Bore 38 receives the control line, bore 39 receives the return line, bore 40 receives the pressure line to the working cylinders, bore 41 is connected to the line to the cut-in accumulator, and bore 42 is connected to the manifold line. Piston 43 with rod 44 sits on cone 45 which together with seat 47, an intermediate member 56 and spring 46 forms a complete check valve. A second valve is formed by cone 49, seat 51, an intermediate member 57 and spring 50. The gaskets 52 effect the necessary static sealing, while the dynamic sealing is effected by two packing rings 58 and 59. The mode of operation of this working valve fully corresponds to that of the working valve shown in FIG. 4.

A form of differential cylinder advantageous for switchgear is shown in FIG. 6. The line organization, the number of by-passes or deviations, and the length of the flow paths is particularly favorable in this case and permit operation of the switchgear with a minimum expenditure of energy, short switching periods and quick movements of the driving elements. To housing 60 is screwed a pressure pipe 61 and sealed by a gasket 62. To the other end (not shown) of pipe 61 is connected a working valve. To housing 60 are further connected two differential cylinders 63, 64 as well as cut-out accumulator 14. Further, housing 60 comprises a central bore 65 into which is screwed choke 18, a cross-bore 66 which connects cut-out accumulator 14 with the differential cylinders 63 and 64, and the stepped bores 67, 68 for receiving the latter. The differential cylinders are similar to each other in construction. An exterior cylinder tube 69 is secured to housing 60 by means of a spring ring 70 and a flanged case 71, and is sealed by a gasket 72. Into the free end of tube 69 is screwed a closure means 73 which locates two spring rings 74, 75 with a gasket 76, two packing rings 77 and a guide sleeve 78. Into the latter is screwed a venting screw 79. Sleeve 78 in turn centers an interior cylindrical tube 80 and locates same by the shoulder of bore 67 in housing 60. To the lower end of piston rod 81 are secured a piston 82, a damper 83 and a damper bush 84. To the upper or free end of piston rod 81 which includes a threaded portion 85, is secured the contact pin (not shown) of the electric point of interruption. Cut-out accumulator 14 may be of any suitable type, for example a gas-filled type and a moving piston. In the state shown, accumulator 14 is discharged and the entire system is under no pressure or is under a residual pressure which is very much smaller than the operating pressure. When a liquid flow of sufficient cut-in pressure is supplied through pressure line 61, piston 82 with rod 81 and contact pins coupled thereto is moved upwardly, while choke 18 comprising a set of orifice plates passes only a very small flow. When the differential cylinder pistons move upwardly, the liquid present in the interior cylindrical tube 80 is displaced and moved into the cut-out accumulator through the annular channel formed between tube 80 and the exterior cylindrical tube 69 as well as through the bores 66 and 65. The rated volume of this accumulator is so related to the displacement volume of the differential cylinders 63 and 64 that on termination of the piston movement the accumulator will have been charged, at the least, to the minimum cut-out pressure but, at the most, to the maximum working pressure. By means of bore 65 and choke 18 a slow pressure compensation is rendered possible between the spaces connected to cut-out accumulator 14 and the pressure line 61 which is connected to the cut-in accumulator. As long as the pressure in line 61 is maintained upon completion of the cut-in movement, differential cylinder piston 82 remains in its upper position. System pressure fluctuations which are only slowly variable in time, do not have any influences on this latter condition, as they may be compensated through choke 18. The cut-out movement, i.e. the downward movement of the differential cylinder pistons 82, is initiated by decompression and connection of pressure line 61 with the return line. Cut-out accumulator 14 then redelivers the working capacity stored therein, by expanding and redelivering the liquid stored therein to the differential cylinder piston 82 through the bores 65, 66 and the annular space between the interior and exterior cylindrical tubes. Piston 82 thus moves downwardly, and the liquid displaced thereby is delivered through pressure pipe 61 into the return line. As choke 18 allows only a very slow flow, hardly any liquid will pass through choke 18 during the short period of time of the cut-out movement, so that there will be practically no loss of cut-out energy.

In FIG. 7 is shown an arrangement of the differential cylinders with a superposed check valve, whereby it becomes possible to make further use of the liquid displaced by the pistons during the cut-out movement, instead of delivering same at once into the return line. Equal parts have again like reference numerals as in FIG. 6. The housing now comprises (apart from the bores 65, 66 and 67) an additional bore 86 with a cross-bore 87 which is closed by a screw 88. To bore 86 is connected an injector line 89 which leads to the electric switchgear (not shown). The automatic reversing valve inserted in front of the cylinders comprises a valve body 90 located in the housing by the interior cylindrical tube, and two gaskets 91. In valve body 90 is disposed a bored valve cone 92 which is sealed against body 90 by a packing ring 93. The bored guide plate 94 guides a control piston 95. The valve described here may be replaced by other valve means without impairing the mode of operation. During the cut-in step, the reversing valve affords free passage to the stream of driving arriving from pressure pipe 61 and flowing through bore 67 into the interior cylindrical tube 80 and cylinder piston 82. At the same time, valve cone 92, by virtue of the cut-in pressure is pressed down to its seat in valve body 90 and thus cuts off communication between the spaces subjected to the cut-in pressure and the bores 87, 86. When pressure pipe 61 is relieved for the purpose of cutting out, and the differential cylinder piston moves downwardly under the action of the charged cut-out accumulator, as described before, valve cone 92 under the action of control piston 95 is moved downwardly to its lower stop. Piston 95 thereby closes the bore of cone 92, while the latter opens a flow passage from the interior cylindrical tube 80 to the bores 86, 87 and to the injector line 89. The liquid displaced by the piston during the cut-out step, now in turn does further work in the switch portion pertaining to the electric breaker unit during the cut-out movement, for example when actuating an injector pump. When the liquid driving agent is at the same time an electrical insulating liquid, the displaced itself serves as injection liquid.

What I claim as new and desire to secure by Letters Patent, is:

1. In a hydraulic drive for electric switchgear:

A pressure circuit including pumping means and a manifold for supplying hydraulic fluid at a working pressure, and a reservoir and a return pipe containing hydraulic fluid at an exhaust pressure below said working pressure;

A working circuit including a working cylinder having a differential piston in it, said piston having one face larger than the other, a cutting-out accumulator communicating with the smaller face of said piston, a cutting-in accumulator communicating through a working valve with the larger face of said piston, the larger face of said piston also communicating through a first check valve with said return pipe, and the larger and smaller faces of said piston communicating with each other through a choke; and A control circuit including a first hydraulic control element for controlling the operation of said working valve, said first control element communicating through a control valve with said manifold and communicating through a second check valve with said return pipe, a second hydraulic control element for controlling the operation of said control valve, said second control element communicating through a first pilot valve with said manifold and communicating through a second pilot valve with said return pipe.

2. In a hydraulic drive, the elements defined in claim 1, wherein said pilot valves are solenoid operated.

3. In a hydraulic drive, the elements defined in claim 1 wherein said working valve and first hydraulic control element are part of a unitary structure comprising a body having an inlet port connected to said cutting-in accumulator, an outlet port connected to said working cylinder so as to communicate with the larger face of said differential piston, and a valve seat between said ports, said working valve adapted normally to seat upon said valve seat but movable away from it, said body also having a pressure port communicating with said manifold and said return pipe through said control valve and second check valve respectively, and a bore communicating with said pressure port and aligned with said valve seat, said first hydraulic control element in the form of a piston movable within said bore, and a piston rod mounted on said piston and engaging said working valve whereby when said pressure port communicates with said manifold said piston moves toward said working valve and said pitson rod unseats said working valve.

4. In a hydraulic drive, the elements defined in claim 3 wherein said first check valve is also part of said unitary structure, said body having an exhaust port connected to said return pipe and another valve seat between said exhaust port and said outlet port, and said first check valve adapted normally to seat on said other valve seat but adapted to be unseated to permit flow of hydraulic fluid from said working cylinder to said return pipe.

5. In a hydraulic drive, the elements defined in claim 1 wherein said working cylinder comprises a body having an inlet port, an outlet port, and a pair of inner and outer concentric tubes, said differential piston being slidable within said inner tube, the end of said inner tube corresponding to the larger face of said piston communicating with said inlet port, and the end of said inner tube corresponding to the smaller face of said piston communicating with an annular region between said tubes, said annular region communicating with said outlet port.

6. In a hydraulic drive, the elements defined in claim 5 wherein said coke is formed in said body between said inlet and outlet ports.

7. In a hydraulic drive, the elements defined in claim 5 including a valve seat between said inlet port and the end of said inner tube corresponding to the larger face of said piston, an injector port between said valve seat and said inlet port, and a valve adapted to seat on said valve seat, said valve preventing flow between said inlet port and said injector port but permitting flow between said outlet port and said injector port.

References Cited in the file of this patent

UNITED STATES PATENTS

| | | |
|---|---|---|
| 1,290,203 | Houk | Jan. 7, 1919 |
| 2,623,358 | Greer | Dec. 30, 1952 |
| 2,679,854 | Stevenson | June 1, 1954 |
| 2,802,336 | Ball | Aug. 13, 1957 |

FOREIGN PATENTS

| | | |
|---|---|---|
| 1,144,287 | France | Apr. 23, 1957 |

OTHER REFERENCES

Power Engineering Magazine, February 1961 issue (page 63, FIG. 3).